May 31, 1966  W. C. BURGESS, JR  3,253,663
VIBRATOR MOUNTING
Filed April 10, 1963
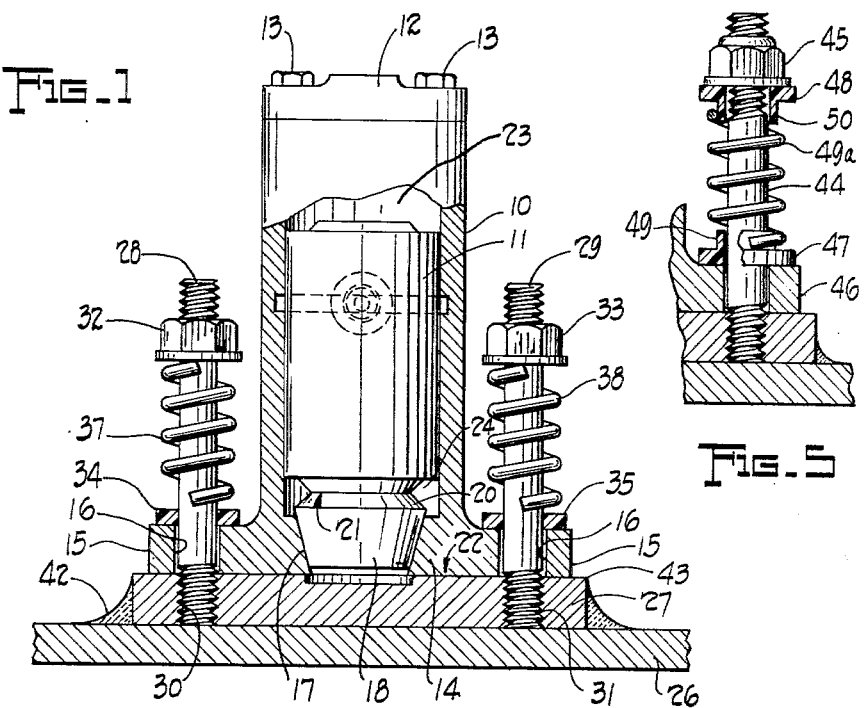
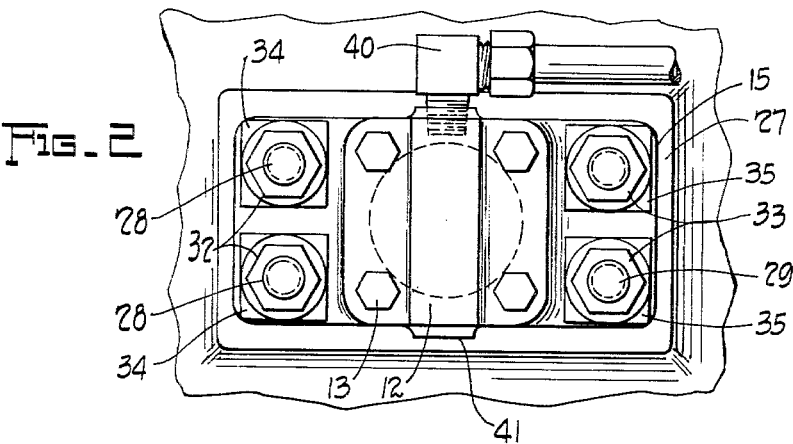
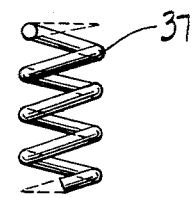
INVENTOR.
WARREN C. BURGESS JR
BY
Schramm, Kramer & Sturges
ATTORNEYS.

United States Patent Office 3,253,663
Patented May 31, 1966

3,253,663
VIBRATOR MOUNTING
Warren C. Burgess, Jr., 18900 Detroit Road,
Lakewood 7, Ohio
Filed Apr. 10, 1963, Ser. No. 271,991
16 Claims. (Cl. 173—131)

This invention relates, as indicated, to mountings for vibration inducing devices, and more particularly to structure for securing a pneumatically driven vibration inducer to a surface to be vibrated.

Pneumatic vibration inducers of the impacting type are capable of generating very high impact and inertial forces, respectively, the reactionary forces of which impose a severe strain on mounting studs or bolts. In fact, one of the greatest problems with pneumatic vibrators, for example those employed as bin vibrators, has been the difficulty in lastingly anchoring them to the bin wall. For convenience, vibrator manufacturers have heretofore supplied a mounting plate having studs thereon to fit the mounting flange of the vibration inducing device. Installation is effected by welding the mounting plate to the driven member, e.g. a bin, railroad car, hopper, drum, etc., which is to be vibrated. Alternatively, the mounting studs are provided integrally with the driven member, and the vibration inducing device selected or designed to fit the studs. Most usually, one or more of the mounting studs fail after only a few hours of operation at the most, necessitating costly repairs and loss of operation time.

The problem is particularly intensified with the impacting type of pneumatic vibration inducer. Conventional mounting of these devices has been to provide anchoring bolts extending from the face of a mounting plate or surface, and to tighten down on the retaining nuts to prevent movement of the vibrator with respect to the mounting plate or surface. The containment of the reaction to a pneumatically impelled impacting force is extremely difficult unless the pneumatic impact vibrator is operated at a point far below its point of maximum efficiency, e.g. at a very low pressure, or a very low amplitude of vibration. Further difficulties are introduced by the fact that shop pressures are frequently too high and create forces which the mounting bolts are unable to withstand. Experience with conventional mounting means under conditions of most efficient operation of the impacting vibration inducer shows that ordinary more ductile low carbon steel studs tend to outlast the high tensile strength steel studs, the latter lasting at optimum operating pressure no more than about one hour to one hour and a half. The low carbon steels tend to last about four times this long.

I have discovered that in mounting vibration inducing devices, whether of the electrical, pneumatic or mechanical types, it is only necessary to hold the vibrator against the surface of the object being vibrated with a constant force, and that it makes no difference whether the vibrator body moves off the surface after impact or not. Heretofore, the practice has been to secure the vibrator tightly to the surface of the driven body so that it could not move in either direction with respect to the mounting bolts or studs. As pointed out above, it is impractical to contain rigidly an impacting vibrator. I have found that an impacting vibrator will react and move away from the surface being vibrated; and with a 1⅝ inch diameter by 2" long pneumatic impacting piston and at 90–95 p.s.i.g. pressure, such movement may be to the extent of up to about 30 thousandths of an inch with a force of approximately 1000 lbs. on each of two studs. Where the repetitive high frequency movement is of a magnitude from 1–30 thousandths, as in this specific case, it exceeds the elastic limit of the bolt resulting in rapid fatigue and failure. There is needed means for applying a substantially constant holding force which provides freedom of the vibrator body to move away from the surface after impact.

I have found that the ideal system for supplying the constant or substantially constant force which is required for holding the vibrator against the surface and at the same time permitting it to react and move away from surface, is an elastic medium, such as air. Thus, the provision of pressurized air cylinders coacting to hold the vibrator against the driven member meets both desiderata in a most efficient manner. For some installations such structure may be used to the achievement of the desired ends of the present invention. However, for the usual installation, such means are far too expensive.

A structure which approximates the effect of a partially compressed air body, is a spring or elastic member, preferably a helical coil spring. I have found that coil springs as a reaction member for a reciprocating vibrator may be used to absorb the shock on reaction and thereby prolong the life of the mounting bolts. In other words, the mounting means of the present invention are so adapted and constructed that the vibrator secured thereby to the driven member is free to move away from the surface being driven following the drive or impact stroke.

The interposition of a spring or elastic member between the reacting surface of the vibrator, e.g. the mounting flange, and the fastening or mounting means does effect a marked improvement in the life of the mounting bolts or studs, and thus is most useful for this purpose. I have found further that for best results, coil springs when used as the shock absorbing medium are desirably modified in order that the life of the entire mounting may be greatly improved, i.e. to withstand the 6 to 7 million cycle terminal limit for fatigue, and enter the region of indefinitely long life. It is accepted that when a material subject to failure by fatigue induced by flexure has surpassed flexures of the order of 6 to 7 million cycles, and barring the introduction of extraneous forces or imperfections, the device will last indefinitely, i.e. upwards of 700 million cycles operating at impact strengths 50% greater than normally encountered in industrial applications.

In order to advance into this desired life region, it has been found that although the mounting bolts no longer fail when helical coil springs, particularly die springs, are used, the coil springs themselves fail after 30 to 40 hours. The springs which were being used in order to overcome the principal problem of short stud life were those in which the ends were squared by grinding. In the run-out portion at the ends of the coil spring where the metal decreased in thickness from the original wire diameter or cross section, flexure occurred to a much higher degree than in the intermediate portion of the spring. The run-out portions would impinge against the inwardly succeeding convolutions causing notching or local surface deformation and ultimate failure of the spring.

It was then discovered that best results were secured when the springs were provided with "plain ends not squared" which is a term commonly used in the coil spring art. Alternatively, those springs which were provided with squared ends could be modified so as to convert them to springs with plain ends not squared. Such modification could be effected, for example, by merely sawing off the squared off portions of each end of the coil of wire. This obviated the problem of failure of the springs at the terminal portions thereof.

The next problem which was encountered was with respect to the points where the ends of the spring contacted the fastener, i.e., the nut or washer, if used, and the mounting flange of the vibrator, the latter point of contact giving the most trouble. This latter structure is usually cast and has a relatively rough surface. Notching of the spring at the flange end sometimes developed causing failure of the spring and consequent loss of the requisite mounting force, i.e., 1000 pounds force in the case of 1⅝ inch piston diameter impacting vibrator operating at 90 to 95 pounds per square inch air pressure. It was found that the interposition of a resilient collar formed from a material which had a hardness less than the hardness of the metal from which the spring was made prevented notching of the spring in this region. Such a collar may also be used satisfactorily at the opposite end of the spring. Preferred material for construction of the spring supporting collar is hard nylon which resists plastic flow. It has a Durometer reading greater than 100. However, any non-ferrous material including softer metals and having a hardness less than the hardness of the spring might be used.

It was also found that under 20% to 30% spring compression, there is a tendency in operation for some springs to buckle longitudinally and introduce a whipping action. Such action may lead to notching and failure at the spring ends or the adjacent studs. By providing a bushing between the spring end and the stud, this problem is avoided.

Another consideration which appeared in the course of this development and which relates to a still more desirable embodiment is that of the relative operating frequency of the vibration inducer and the natural frequency of the mounting spring. Where these frequencies or principal harmonics thereof, are substantially the same as between the vibrator and the mounting spring, there is found at operating frequencies equal to the natural frequency of the spring, a compression wave forms in the spring which moves back and forth along the spring and is visible with a stroboscope. With such compression, adjacent convolutions of the spring tend to come in contact with each other and may result in notching, or "Brinelling," and ultimate failure of the spring.

This can be controlled by either of two means. The first is to utilize springs which have a natural frequency substantially different from the natural frequency of the pneumatic inducing device. Secondly, the spring may be further modified so that the convolutions are separated by stretching the spring beyond its elastic limit so that the pitch is increased. However, as a practical installation, I have found that when the fastening nuts are tightened down on the springs to hold the vibrator in place against the object to be vibrated, this problem is not too important if the spring is compressed at least about 20% and no more than 30%.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

This invention will be better understood by having reference to the annexed drawings which illustrate preferred embodiment of the present invention and wherein:

FIG. 1 is partially cut away elevation of an impacting type pneumatic vibration inducing device showing the details of one form of the improved mounting of the present invention.

FIG. 2 is a top view of the pneumatic vibration inducer shown in FIG. 1.

FIG. 3 is an elevation of a die spring modified for use in the mountings of this invention.

FIG. 4 is a top view of a plastic spring base typical of these used in preferred embodiments of the mountings hereof.

FIG. 5 is a fragmentary view in partial cross-section of a preferred structure for securing the spring in the mounting.

Briefly stated, the present invention is in the provision of a mounting for a reciprocating free piston vibration inducing device for inducing vibration in a body or member to which it is attached such as a bin, railroad car, hopper, etc. The vibration inducing device itself is characterized by a reciprocable piston, a cylinder in which the piston is freely reciprocable, and a mounting flange extending laterally from the cylinder, usually at one end thereof, and having stud receiving holes therein. The mounting comprises in combination a mounting base which may be a separate item or which may be integral with the device to be vibrated, and having stud members extending therefrom for extension through the mounting flange. Fastening means such as self-locking nuts or other frictionally retained means are provided and adapted to coact with each of the studs to transmit a retaining force for the vibration inducing device to the studs. Coacting between the mounting flange and fastening means there are provided resilient shock absorbing means.

Referring now more particularly to FIG. 1, there is here shown in side elevation, partially cut away, a pneumatically driven, impacting type vibration inducing device having a cylinder 10 and a free piston 11 disposed therein for free reciprocation therein. Cylinder 10 and reciprocating free piston 11 are sized in accordance with conventional tolerances for such reciprocating pistons. Cylinder 10 is provided with a closure cylinder head 12 at one extremity. Cylinder head 12 is secured to the free end of cylinder 10 such as by bolts 13.

The opposite extremity of the cylinder 10 conveniently has cast integrally therewith cylinder head 14 which extends laterally to each side of the cylinder 10 to form laterally extending mounting flanges 15. Mounting flanges 15 are in turn conveniently provided with stud receiving holes or apertures 16. It is conventional practice in the construction of reciprocating free piston-cylinder devices of the type herein described to provide in the cylinder head 14, a concentric cylindrical bore therethrough into which there is inserted a flanged plug which serves as an anvil in the event the device is to be used as an impacting type vibrator. I have found that best results are secured in impacting type pneumatic type vibrators when the concentric opening in cylinder head 14 is provided with tapered walls such as walls 17 into which there is fitted correspondingly tapered plug 18 for closing the opposite end of cylinder 10. The amount of taper conveniently ranges between .1 inch and 1.0 inch per foot on the diameter. In a specific example of a plug or anvil member corresponding to plug 18, the maximum diameter of a plug was 1.05 inch and the taper from the maximum diameter was 0.6 inch per foot on the diameter. The crown portion 20 of anvil 18 is preferably machined to provide a non-chipping surface, and in the specific example cited, the non-chipping radius 21 is about 0.25 inch. The extent of this radius depends upon the extent of carburizing of the steel in the anvil, and the roughness of the surface of the piston impacting upon it. Where the corners are sharp, chipping is frequently encountered which results in damage to the apparatus. Where the sharp edges of the upper surface of the anvil, i.e., the crown portion 20 are rounded as indicated in FIG. 1, chipping is not a problem, and pistons need not be carefully finished on the impacting end. Accordingly, pistons may be saw-cut and used as impacting instruments against anvils which have been machined in accordance herewith.

The cylinder head 14 in the specific example indicated is conveniently about 1 inch thick, and the plug 18 fails to extend to the lower surface 22 by an amount ranging from about ⅛ to ¼ of an inch to allow for the anvil 18 to be driven into the cylinder head 14 without projecting beyond the lower surface of the vibration inducing device.

The porting within the piston is of conventional design, and reference may be had, for example to the patent to Becker 2,787,251 for pistons of the impacting type and the porting which accompanies such pistons. Another piston-cylinder system which may be used in accordance herewith is that which is described in the patent to Burgess 2,861,548. To modify that device to provide an impacting type vibrator, end clearance can be provided in the high pressure cavity 23, but no end clearance is provided in the impacting chamber 24.

The present invention is primarily concerned, however, with the means by which such vibration inducing devices are secured to a body or member to be vibrated, and accordingly any suitable driving means whether pneumatic, electrical or mechanical may be employed and the mounting devices of the present invention will be found effective therefor.

Accordingly, there is shown in FIG. 1 a base 26 which may be a side wall of a bin, railroad car, hopper, or the like. In the preferred embodiment here illustrated, there is provided an auxiliary mounting base 27 which may be supplied along with a vibration inducing device. Mounting base 27 is provided with elongated studs 28 and 29 which are positioned in mounting plate 27 so as to pass readily through the holes 16 in flanges 15.

It has been found that best results are secured when the studs 28 and 29 are threaded only at their extremities. Thus, tapped holes 30 and 31 are conveniently provided in mounting plate 27 for receiving and retaining the ends of studs 28 and 29, respectively.

In order to secure the vibration inducing device to the mounting plate 27, there are provided nuts 32 and 33 which are conveniently of the self-locking type.

For the reasons previously explained, there are also conveniently provided nylon collars 34 and 35. Instead of nylon, there may be used very hard polyethylene or any other resinous material which is resistant to flow. There also may be used as the collars 34 and 35, non-ferrous metal materials which have a hardness less than the hardness of the spring. Also, collars like 34 and 35 may be used at the upper ends of springs 37 and 38. Thus, a material such as bronze, copper, or the like may be used. FIG. 4 shows a top view of a typical collar such as collar 34.

Interposed between the nut 32 and the collar 34 is a helical coil spring of the plain end not squared type such as previously described. In FIG. 3, there has been shown a conventional helical coil spring originally having the ends squared by grinding, but which has been modified to a helical coil spring having plain ends not squared by removing the portions indicated by dotted lines. The modified coil springs are indicated in FIG. 1 by the numbers 37 and 38, respectively. The conversion is achieved quite simply by cutting off the tapered ends of the coil spring until the full diameter of the wire has been reached at a point in the coil where the pitch is constant. Springs with plain ends not squared, and hence requiring no modification, are available commercially.

FIG. 5 shows a preferred arrangement for supporting the spring on stud 44 between the retaining nut 45 and flange 46. Instead of single collars 34 and 35, these may be advantageously replaced with bushing type collars 47 and 48 at both the bottom and top of spring 49a, respectively. Bushing portions 49 and 50 are disposed between spring 49a and stud 44 at the spring extremities and prevent notching and failure at these points because of spring whip during operation.

Referring to FIG. 2, there is a top view of the apparatus shown in FIG. 1, and showing the inlet fitting 40 for the air, and an exhaust port 41. The air supply for the apparatus is obtained from any convenient source, such as an air compressor or an air cylinder equipped with a pressure regulating valve. The pressures at which these vibrators may be operated range from about 10 to about 150 pounds per square inch, and for a piston having a diameter of 1⅝ inches as above described, I have been able to use without failure pressures in the neighborhood of from 90 to 95 pounds per square inch for periods in excess of 250 hours. In relation to conventional mounting means utilizing jam nuts tightly holding the flange to the mounting plate, a similarly sized vibration inducing device will cause failure of the mounting in a period of about 1 hour at a driving air pressure of 60 p.s.i.g. Thus, the improvement factor is in excess of 375.

As indicated above, when the apparatus is supplied from the original equipment manufacturer, there is usually supplied along with it a mounting base 27 having the studs 28 and 29 already mounted so as to fit the holes 16 in the vibrator. The mounting plate 27 is conveniently welded directly to the surface of the member to be vibrated, such as plate 26 in FIG. 1. In effecting the welding of mounting plate 27 to the plate 26, it should be noted that the weld 42 is desirably a full weld. Best results are secured when this weld has a maximum depth at the edge 43 of plate 27 which is equal to the thickness of plate 27.

In tightening down upon the coil springs, the amount of compression imposed upon the spring should be at least about 20% and not more than about 30%. If the upper figure is exceeded, then there is a tendency for the succeeding convolutions of the coil spring to impinge upon one another during flexure causing polishing and "Brinelling" which may ultimately lead to "notch" failure. At compressions less than about 20% of the maximum or sole compression of the spring, the spring has a tendency to part from the retaining nut and collar which may again lead to notching and ultimate failure due to fatigue.

As indicated above, the spring should have a hardness in excess of the hardness of the collar 34 or 35. Conventional die springs which may be used herein have a hardness in the range of from 45 to 55 Rockwell. A suitable metal for collar 34 or 35 has a hardness of about 35 Rockwell. A flow resistant plastic material such as nylon having an equivalent hardness or any hardness which is less than that of the die spring but which will not flow substantially under the heavy pressures applied thereto may also be employed. Such nylon collars and bushings will take a permanent set in conformity with the spring end, but this is the extent of the flow.

There has thus been provided an improved mounting for a vibration inducing device for inducing vibration in a driven member. These mounting devices utilize studs somewhat longer than studs currently employed for the same purpose, and utilize as a shock absorbing means, a resilient member, preferably in the form of a coil spring, which reacts against a nut or other suitable fastener carried by said stud member. Care is required in the manner in which the spring is designed and the manner in which it is used for best results. These mountings are particularly useful with pneumatically driven, reciprocating free piston vibrators which are by their nature capable of being operated at power levels which very quickly cause failure of the mounting studs.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A mounting for a reciprocating free piston vibration device for inducing vibration in a driven member including a piston, a cylinder in which said piston is freely reciprocable, cylinder heads at each end of said cylinder, and a mounting flange extending laterally from said cylinder and having stud receiving holes therein, said mounting comprising in combination, (a) a flange abutting mounting base adapted to be secured to a body to be vibrated, (b) stud members extending from said base having their free extremities extending through stud receiving holes in said mounting flange, each of said holes having a diameter larger than the diameter of the stud received thereby whereby said flange is axially movable relative to said stud members, (c) fastening means secured to the free end of each of said stud members in spaced relation to the mounting flange, and (d) resilient shock absorbent means coacting between said mounting flange and said fastening means and adapted to urge said mounting flange into direct abutting relation with said mounting base and to resiliently compress in response to recoil inducing forces tending to move said flange axially relative to said studs.

2. A mounting device in accordance with claim 1 in which the resilient means includes a coil spring.

3. A mounting device in accordance with claim 2 in which the coil spring is a helical coil spring having plain ends not squared.

4. A mounting device in accordance with claim 1 in which the resilient means includes a coil spring formed from a wire having a predetermined hardness and in coacting relation therewith collar means having a hardness less than the hardness of the spring wire.

5. A mounting device in accordance with claim 4 in which the collar means are formed from a non-metallic resilient solid.

6. A mounting device in accordance with claim 5 in which the non-metallic solid is flow resistant nylon.

7. A mounting device in accordance with claim 1 in which the resilient means is a helical coil spring having a natural frequency different from the operating frequency of the vibration inducing device.

8. A mounting device in accordance with claim 1 in which the mounting base is a separate plate adapted to be welded to said driven member.

9. A mounting device in accordance with claim 8 in which the mounting plate is welded to the driven member and the thickness of the weld at the marginal edge of the mounting plate is at least as thick as the mounting plate.

10. A mounting device in accordance with claim 1 in which the mounting base is integral with the driven member.

11. A mounting device in accordance with claim 1 in which an anvil is located in the cylinder head adjacent the mounting base.

12. A mounting device in accordance with claim 11 in which the cylinder head is provided with a tapered aperture concentrically disposed therein and having the side walls converging toward the exterior of the cylinder and said anvil is correspondingly tapered to fit therein.

13. A mounting device in accordance with claim 12 in which the axial dimension of the anvil is greater than the thickness of the cylinder head.

14. A mounting in accordance with claim 13 in which the base is provided with a shallow recess opposite the anvil.

15. A mounting for a pneumatic impacting reciprocating free piston vibration device for inducing vibration in a driven member including a piston, a cylinder in which said piston is freely reciprocable, cylinder heads at each end of said cylinder, an anvil in one of said cylinder heads adapted to be impacted by said piston, and a mounting flange extending laterally therefrom at the anvil-containing end of said cylinder and having a plurality of stud receiving holes therein, said mounting comprising in combination:

(a) a flange abutting mounting plate adapted to be welded to said driven member, (b) stud members extending from said mounting plate having their free extremities extending through the holes in said mounting flange, each of said holes having a diameter larger than the stud received thereby whereby said flange is axially movable relative to said stud members, (c) fastening means secured to the free end of each of said stud members in spaced relation to the mounting flange, (d) a pair of resilient resinous collars disposed around each of said stud members adjacent said mounting flange and adjacent said fastening means said collars having a Durometer reading of greater than about 100, and (e) a helical coil spring having plain ends not squared surrounding each stud and biased between said collars and coacting to hold the mounting flange of said vibration inducing device directly against said mounting plate with a substantially constant force and to absorb reaction shock forces by resiliently compressing in response to recoil inducing forces tending to move said flange axially relative to said studs.

16. A mounting in accordance with claim 15 in which the collars are provided with bushing portions for separating the spring from the stud at each extremity of said spring.

References Cited by the Examiner

UNITED STATES PATENTS

| | | | |
|---|---|---|---|
| 2,208,730 | 7/1940 | Pfeiffer | 173—133 |
| 2,579,075 | 12/1951 | Hirschberg | 173—133 |
| 2,854,962 | 10/1958 | Bergman | 173—139 |
| 2,933,068 | 4/1960 | Johnson et al. | 173—133 |
| 3,162,252 | 12/1964 | Cobi | 173—91 |

BROUGHTON G. DURHAM, *Primary Examiner.*

L. P. KESSLER, *Assistant Examiner.*